(12) United States Patent
Braun et al.

(10) Patent No.: US 12,736,954 B2
(45) Date of Patent: Sep. 15, 2026

(54) SYSTEM AND METHOD FOR AGGREGATING DATA IN A REMOTE ADDRESS SPACE

(71) Applicant: ABB Schweiz AG, Baden (CH)

(72) Inventors: Roland Braun, Niederkassel (DE); Mario Hoernicke, Landau (DE); Julius Rueckert, Langen (DE)

(73) Assignee: ABB Schweiz AG, Baden (CH)

( * ) Notice: Subject to any disclaimer, the term of this patent is extended or adjusted under 35 U.S.C. 154(b) by 737 days.

(21) Appl. No.: 17/956,929

(22) Filed: Sep. 30, 2022

(65) Prior Publication Data

US 2023/0027121 A1 Jan. 26, 2023

Related U.S. Application Data

(63) Continuation of application No. PCT/EP2021/058152, filed on Mar. 29, 2021.

(30) Foreign Application Priority Data

Mar. 31, 2020 (EP) .................................... 20167246

(51) Int. Cl.

*H04L 67/50* (2022.01)
*G05B 19/418* (2006.01)
*G06F 40/143* (2020.01)
*G06Q 30/0241* (2023.01)
*H04L 65/40* (2022.01)
*H04L 67/02* (2022.01)

(52) U.S. Cl.

CPC .......... *G05B 19/4186* (2013.01); *H04L 65/40* (2013.01); *G05B 2219/34263* (2013.01)

(58) Field of Classification Search

CPC ................ H04L 65/40; G05B 19/4186; G05B 2219/34263
USPC .......................................................... 709/227
See application file for complete search history.

(56) References Cited

U.S. PATENT DOCUMENTS

2011/0035792 A1 2/2011 Leitner
2015/0012141 A1* 1/2015 Schulz .................. G05B 11/01 700/275
2019/0107827 A1* 4/2019 Dhakshinamoorthy .................... G05B 19/4183
2020/0296632 A1* 9/2020 Pudukoli Subrahmanya ............. H04W 80/02

FOREIGN PATENT DOCUMENTS

CN 101076992 A 11/2007
CN 101903837 A 12/2010
CN 102667748 A 9/2012
(Continued)

OTHER PUBLICATIONS

Tuomi, Ian, "Aggregating OPC UA Server for Flexible Manufacturing Systems", Aug. 24, 2015, Aalto University (Master Thesis), p. 1-53 (Year: 2015).*

(Continued)

*Primary Examiner* — Taylor A Elfervig
(74) *Attorney, Agent, or Firm* — Fitch Even Tabin & Flannery LLP

(57) ABSTRACT

An Open Platform Communications Unified Architecture (OPC UA) aggregation server for aggregating at least one OPC UA server in a remote address space is described. The at least one OPC UA aggregation server is configured to support data reduction and/or redundancy mechanisms.

21 Claims, 7 Drawing Sheets

(56) References Cited

FOREIGN PATENT DOCUMENTS

| | | |
|---|---|---|
| CN | 108199897 A | 6/2018 |
| CN | 109672668 A | 4/2019 |
| CN | 110162417 A | 8/2019 |

OTHER PUBLICATIONS

M. H. Schwarz and J. Börcsök, "A survey on OPC and OPC-UA: About the standard, developments and investigations," 2013 XXIV International Conference on Information, Communication and Automation Technologies (ICAT), Sarajevo, Bosnia and Herzegovina, 2013, pp. 1-6 (Year: 2013).*

R. S. Crespí, A. Armentia, I. Sarachaga, O. Casquero, F. Pérez and M. Marcos, "OPC UA Aggregation Server in the Fog," 2019 24th IEEE International Conference on Emerging Technologies and Factory Automation (ETFA), Zaragoza, Spain, 2019, pp. 1256-1260 (Year: 2019).*

D. Großmann, M. Bregulla, S. Banerjee, D. Schulz and R. Braun, "OPC UA server aggregation—the foundation for an internet of portals," Proceedings of the 2014 IEEE Emerging Technology and Factory Automation (ETFA), Barcelona, Spain, 2014, pp. 1-6, (Year: 2014).*

Johansson, "Aggregating OPC UA Server for Generic Information Integration," Master's thesis, *Aalto Univ. of Electrical Engineering*, 67 pp. (Nov. 19, 2017).

Tuomi, "Aggregating OPC UA Server for Flexible Manufacturing Systems," Master's thesis, *Aalto Univ. School of Electrical Engineering*, 61 pp. (Jul. 7, 2015).

European Patent Office, International Search Report in International Patent Application No. PCT/EP2021/058152, 3 pp. (Jun. 18, 2021).

European Patent Office, Written Opinion in International Patent Application No. PCT/EP2021/058152, 8 pp. (Jun. 18, 2021).

Girbea et al., "Automatic Address Space Generation for an OPC UA Server of a Flexible Manufacturing System," *6th IEEE International Symposium on Applied Computational Intelligence and Informatics* (*SACI*), IEEE, 483-488 (May 19-21, 2011).

Ma, "Design and Implementation of OPC UA Multi-Server Aggregation Software," *dissertation, China Academic J. Electronic Publishing House, CNKI*, 75 pp. (May 25, 2018).

Wang et al., "An OPC UA Multi-Server Aggregator with Cache Management," *2018 Chinese Automation Congress* (*CAC*), *IEEE*, 68-73 (Nov. 30-Dec. 2, 2018).

The Patent Office of the People's Republic of China, Office Action in Chinese Patent Application No. 202180026192.1, 9 pp. (Sep. 27, 2023).

* cited by examiner

| Name | Value |
|---|---|
| ConditionId | NodeId |
| NamespaceIndex | 2 |
| IdentifierType | String |
| Identifier | Demo.BoilerDemo.Boiler1.TemperatureAlarm |
| AckedState/Id | False |
| ActiveState | "","Active" |
| ActiveState/Id | True |
| ConditionName | TemperatureAlarm |
| ConfirmedState/Id | False |
| EventId | Len=16,0x08b1998d08619243828bc2fed7238cf7 |
| EventType | NodeId |
| NamespaceIndex | 0 |
| IdentifierType | Numeric |
| Identifier | 9341 |
| Message | "","Controller is not maintaining temperature." |
| Retain | True |
| Severity | 900 |
| SourceName | Boiler1 |
| Time | 14:24:40.089 |

Fig. 6

| Attribute | Value |
|---|---|
| NodeId | NodeId |
| NamespaceIndex | 2 |
| IdentifierType | String |
| Identifier | Demo.BoilerDemo.Boiler1.TemperatureAlarm |
| NodeClass | Object |
| BrowseName | 2, "TemperatureAlarm" |
| DisplayName | "","TemperatureAlarm" |
| Description | "","" |
| WriteMask | 0 |
| UserWriteMask | 0 |
| EventNotifier | None |

Fig. 7

| Name | Value |
|---|---|
| ConditionId | NodeId |
| NamespaceIndex | 2 |
| IdentifierType | String |
| Identifier | SRV_0_NS_2_ID_Demo.BoilerDemo.Boiler1.TemperatureAlarm |
| AckedState/Id | False |
| ActiveState | "","Active" |
| ActiveState/Id | True |
| ConditionName | TemperatureAlarm |
| ConfirmedState/Id | False |
| EventId | Len=16,0x7377db31480a124aa3b14ee71bd0e69a |
| EventType | NodeId |
| NamespaceIndex | 0 |
| IdentifierType | Numeric |
| Identifier | 9341 |
| Message | "","Controller is not maintaining temperature." |
| Retain | True |
| Severity | 900 |
| SourceName | Prefix_Boiler1 |
| Time | 14:37:16.839 |

Fig. 8

| Attribute | Value |
|---|---|
| NodeId | NodeId |
| NamespaceIndex | 2 |
| IdentifierType | String |
| Identifier | SRV_0_NS_2_ID_Demo.BoilerDemo.Boiler1.TemperatureAlarm |
| NodeClass | Object |
| BrowseName | 2, " SRV_0_NS_2_ID_2:TemperatureAlarm" |
| DisplayName | "","TemperatureAlarm" |
| Description | "","" |
| WriteMask | 0 |
| UserWriteMask | 0 |
| EventNotifier | None |

Fig. 9

SYSTEM AND METHOD FOR AGGREGATING DATA IN A REMOTE ADDRESS SPACE

CROSS-REFERENCE TO RELATED APPLICATIONS

This patent application claims priority to International Patent Application No. PCT/EP2021/058152, filed on Mar. 29, 2021, which claims priority to European Patent Application No. EP20167246.6, filed on Mar. 31, 2020, each of which is incorporated herein in its entirety by reference.

FIELD OF THE DISCLOSURE

The present disclosure relates to an Open Platform Communications Unified Architecture (OPC UA) aggregation server, an OPC UA aggregation system, a method for aggregation in an OPC UA system, a computer program element and a computer readable medium.

BACKGROUND OF THE INVENTION

OPC UA is a standard specification defining communication of on-line data from various devices from different manufacturers. Future Distributed Control Systems (DCS) will run on OPC UA-connected devices. OPC UA is a platform-independent, service oriented client-server architecture, which transports machine data as control values, measurement values and parameters, and describes the machine data semantically.

UA servers as OPC UA servers receive and expose information, such as sensor data, from a device. A UA server supports information models, which define, how the information is typed and classified. The representation of this information is called the servers address space. UA clients are applications that connect to UA servers. Clients are used, for example, to find information from the server's address space, to read and write server data, to subscribe to certain changes such as data changes, or events such as alarms, and to call server methods. The communication between clients and servers is handled by services. The address space is the actual representation of the information that a UA server exposes. It is formed by nodes and references, which can be explored and displayed by a UA client. A node may be compared to an object in object-oriented programming languages. A node comprises attributes, methods, and events. Attributes can have values, which can be read, methods are called by a command, and events can be sent to exchange certain information between devices. Events are alarms and conditions, occurring e.g. at data changes. An event comprises a reception time stamp, a message and a degree of severity. References are used to relate nodes to each other and attributes are used to describe a node. The information model is based on the nodes.

An OPC UA system may be organized according to an aggregation architecture. An aggregation architecture comprises aggregated servers and aggregation servers, also referred to as aggregating servers in this disclosure.

OPC UA aggregated servers represent the entities of an automation system. These are the underlying servers which may either represent a single component (e.g., a field device) or a subsystem that consists of a set of components, parts of the automation system or the entire automation system. The nodes that are created and managed by the aggregated servers form the remote address space. The counterpart to the remote address space is the aggregated address space, which is formed by the nodes in the aggregating server.

The aggregation server is the core of the aggregation architecture. It connects to underlying servers via OPC UA services and aggregates their type, instance and structure information.

Thus, a single server can be used to connect to multiple other servers and to represent their information in a unified manner. This way, a client connecting to the server can access the data of multiple servers from a single source.

An OPC UA system may accommodate hundreds or even thousands of nodes. Especially when starting up the system, it may take several minutes to aggregate all nodes in an aggregation server. Often, only a part of the data comprised in the nodes is interesting for an operator, so that it may happen that the client has to cope with a high amount of data, which it has to sort or to handle before creating its view, or irrelevant data is presented by the view of the client.

Ian L Tuomi: "Aggregating OPC UA Server for Flexible Manufacturing Systems", describes the requirements definition, design, and implementation of an aggregating server for flexible manufacturing systems. Explanations of the architecture, modules, and functionality are provided including the configuration and mapping between a node in the aggregating address space and its sources. CN 108 199 897 A describes an OPC UA multi-server aggregation method supporting cache management, which realizes the collection of the underlying server data and realizes seamless forwarding to upper-layer clients.

BRIEF SUMMARY OF THE INVENTION

The described embodiments pertain to a method for aggregating data in an OPC UA system, the OPC UA aggregation system, the method for aggregating data in an OPC UA system the computer program element and the computer-readable medium. Synergetic effects may arise from different combinations of the embodiments although they might not be described in detail.

The embodiments of the present disclosure that concern a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

The term "server" may be a software component or a hardware component. In case the server is a hardware component, it may comprise several software servers. Similarly, a client may be a software component or a hardware component. In this disclosure, "server" and "client" are used as if they were a hardware component, however, it is understood that they may be also software components without limitations resulting therefrom.

According to a first aspect, an OPC UA aggregation server for aggregating at least one OPC UA server in a remote address space, wherein the at least one OPC UA aggregation server is configured to support data reduction and/or redundancy mechanisms.

One of the main purposes of an OPC UA server is to provide a consolidated view of data of a plurality of OPC UA servers, which are usually distributed in the field. Clients may connect to the OPC UA aggregation server, and access the data that may be foreseen, e.g., especially for that client. Such an OPC UA access of data has the advantage, that the OPC UA aggregation server has yet collected the data from the OPC UA server, and has pre-processed the data. Pre-processed means, for example, that the data types are 'standardized' in the address space of the aggregation server, relations between data or objects, are available. The collected data is essentially complete since it was the task of the server to collect data from the entire remote address space, and services provide data updates when values, e.g., measurement values of a node, change, etc. The client can access, therefore, the data fast and essentially complete, without the need of storing, e.g., redundant data type definitions for interpretation of the data, or functions for conversions from different type definitions to the one the client needs. This comfort or goal is paid with resources as bandwidth due to high data rates, and time, especially at start-up.

BRIEF DESCRIPTION OF THE SEVERAL VIEWS OF THE DRAWING(S)

FIG. 6 is a screen clip of data types before transformation, according to an embodiment of the present disclosure.

FIG. 7 is a screen clip with details of an alarm as provided by an alarm server before transformation, according to an embodiment of the present disclosure.

FIG. 8 is a screen clip with details of an alarm as provided by an alarm server after transformation, according to an embodiment of the present disclosure.

FIG. 9 is a screen clip data types after transformation, according to an embodiment of the present disclosure.

DETAILED DESCRIPTION OF THE INVENTION

The aggregation of OPC UA servers provides a consolidated view on remote defined address spaces. In large systems, where multiple OPC UA Servers run large address spaces, importing the complete address spaces of all remote servers before it becomes operational is time consuming, even if the network runs at high data rates and even if the time needed to import a single node from an external address space is small. A large number of nodes in large systems will result in a long start up time, which may take several minutes. In the following the system and the method according to the invention is explained that reduces the start-up time.

Figure 1:
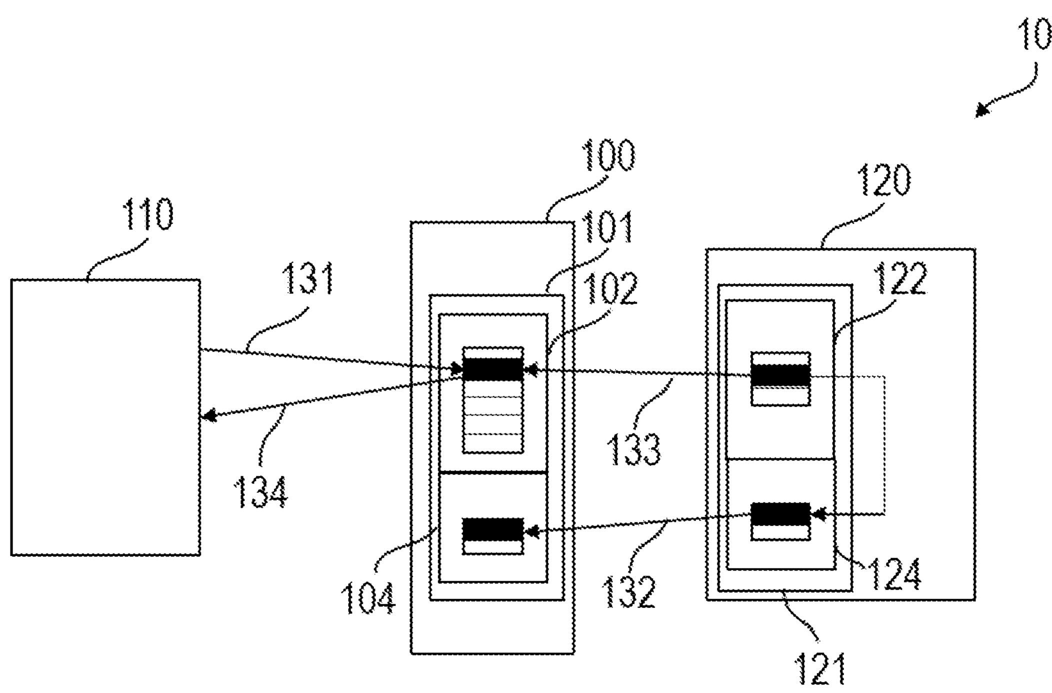
FIG. 1 is a block diagram of a system comprising an components according to an embodiment of the present disclosure.

FIG. 1 shows a block diagram of an aggregating system 10 comprising an OPC UA aggregation server 100 on which an aggregation process is implemented, a client 110 on which a client application is implemented, and an OP UA server 120, which is to be aggregated. The aggregation process implemented in the aggregation server 100 comprises the aggregated address space 101 with objects 102 and type definitions 104. Correspondingly, the OP UA server 120 to be aggregated comprises objects 122 and type 124 definitions in the remote address space 121. In FIG. 1 only one OP UA server 120 is depicted, however, a high number of OP UA servers might be integrated into the aggregating system 10. In the following, an example is presented, which illustrates an embodiment of the invention.

In a first step, 131, the client application of client 100 wants to read a variable, for example, a variable (A). The client 110 knows from any of the previous sessions the description of the aggregated address space 101. Alternatively, the client 110 has imported the description of the aggregated address space 101 before, for example, by reading a configuration.

In a second step, 132, the aggregation process in server 100 may then cause the OPC UA aggregation server 100 to aggregate the NodeId of the node from the client used NodeId. Browsing the dependencies for the requested variable (A) the aggregation process in server 100 aggregates the type definitions 122 and other context relevant data before carrying out step 133. In step 133, the aggregation server 100 aggregates the requested variable (A). The aggregated data is also stored a cache. In step 134, the aggregation process responds to the client request using the aggregated data of variable A. Further requests referring variable (A) will be managed based on cached data, except for live values that must be read from the external OPC UA Server.

In the following, an example of a NodeID translation, which enables a fast aggregation on demand using the structural information is described. An OPC UA server hosted address space contains nodes that an OPC UA client can address using an OPC UA specified NodeId. A NodeId allows, therefore, addressing nodes in an address space. The NodeId that is used in the aggregated address space is designed in a way allowing to infer the URL of the aggregated OPC UA server and to calculate the NodeId of a node in the address space of an aggregated OPC UA server. A NodeId consists of two parts. A first part is the reference to a namespace, also designated as namespace index. A second part may be a number for identifying the node in the namespace, for example, a Universally Unique Identifier (UUID), or a string. Other options are possible.

A concept described in the following may be applied to allow the translation of OPC UA nodes identity based on a rule that is suitable to translate NodeIds belonging to that space where instances are defined, e.g., a namespace in the remote address space, and a rule that is suitable to translate NodeIds of the type definition area.

In the remote or aggregated address space, the used NodeId is designed in a way allowing to infer the URL of the aggregated OPC UA server and to calculate the NodeId of a node in the address space of an aggregated OPC UA server. The instance specific (e.g. object or type) translation rule needs to incorporate the identity of the server, the identity of the namespace, and the identity of the node itself. It does not matter how these elements of the aggregated instance ID are ordered. The only thing counting is, all elements are present. The identity of the server and the identity of the namespace may be abstract, but this is no requirement. The abstractions, which could refer to some internal look-up table, save memory, since the abstractions will become shorter than the actual identities. These actual identities are quite lengthy URLs. An example of a translated NodeId could be: "SRV8 NS11_1D_<theOriginalNodeId>". SRV8 refers to an element (Index=8) in the lookup table that registers all URLs of aggregated servers. Accordingly, NS11 refers to an entry in a collection that lists all aggregated namespaces, which may also comprise URL strings.

The type specific translation rule needs to incorporate the aggregated namespace and the identity of the type node only. Also for the type specific translation, the order of the elements of the aggregated type identity does not matter, as far as all elements are present. The identity of the namespace may again be abstract using, for example, an internal look-up table to save memory. An example of a translated type NodeId may be: "NS11_1D_<theOriginalNodeId>". NS11 refers to an entry in a table that lists all aggregated namespaces, which may also comprise URL strings.

This concept enables a generic address space translation that works without any address mapping tables. This concept enables a secure way to verify aggregation results, since it leaves the traces to the aggregated data source.

Figure 2:
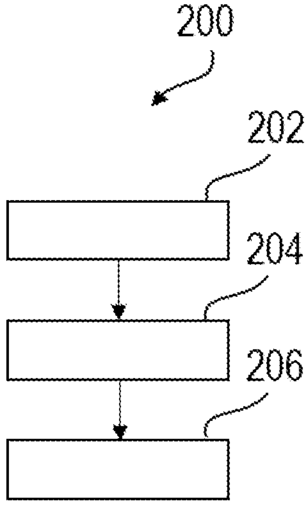
FIG. 2 is a flow diagram of a method according to an embodiment of the present disclosure.

FIG. 2 shows a block diagram of a method 200 according to an embodiment.

In a first step 202 of the method 200, a client requests data from an aggregation server. In a second step 204, the aggregation server aggregates remote address space data from the aggregated servers. This step may be performed upon receiving a request and may comprise aggregating data on demand regarding the content of the data and the point of time when to aggregate the data. Independently from that, this may comprise a filtering of data, supporting redundancy, selecting fast or slow data, and/or transforming events as described in more detail below. In a third step 206, the client receives and presents the requested remote address space data.

As an example, the requested remote address space data may comprise a NodeId or object data. In a second step 204 of the method 200, data from a remote address space 121 at a time when requested is aggregated 132, 133. The client determines the type data related to the requested NodeId or object data and transmits 132 the type data 124 and the object data 133, 122 to the aggregation server 100. Further, the aggregated data is cached.

Figure 3:
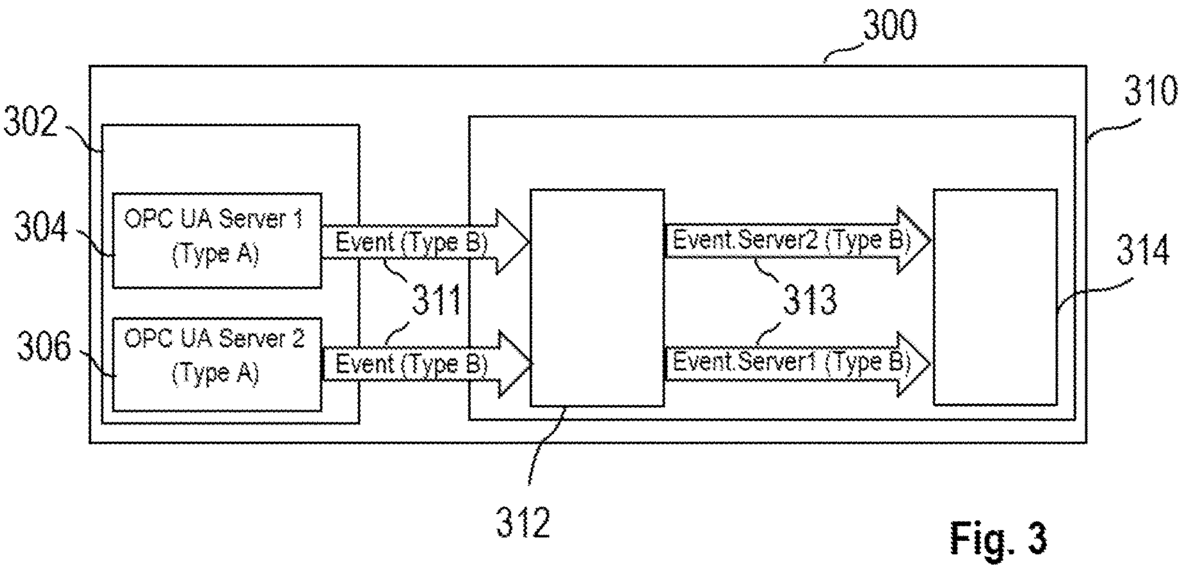
FIG. 3 is a schematic of a usual modular automation system in accordance with the disclosure.

FIG. 3 shows a usual modular automation system 300. The usual OPC UA based automation system 300 comprises automation modules 302 that an aggregating OPC UA server 312 integrates into a common address space. The modules 302 of the automation system 300 implement the UPC UA server 1, 304, and server 2, 306, of type A. For example, an application on a client device 314 runs an OPC UA client service to interact with the modules 302 of an automation system 300 through the aggregated address space. Besides of the expected IO-functionality, an application may need to understand the events and alarms from the modules 302 of the automation system 300. The challenge is about understanding the origin of an alarm or event, that is, for example, the event source or the alarm source. In relation to an OPC UA client 314, the aggregating OPC UA server 312 is a sort of a service and data proxy for the aggregated OPC UA servers 304, 306. When an OPC UA client 314 subscribes for events, the aggregating OPC UA server 312 forwards this request to the aggregated OPC UA servers 304, 306. The aggregating OPC UA server 312 forwards 313 the events, as e.g. events of type B, generated and sent 311 by the aggregated OPC UA servers 304, 306 to the UPC UA client 314.

In an aggregation scenario, an OPC UA client 314 may subscribe to events from the aggregating OPC UA server 312 in general. The OPC UA client 314 can subscribe to events from an object named server (which is a mandatory OPC UA specified object for all OPC UA servers). The aggregating OPC UA server 312 forwards this event subscription request to all aggregated OPC UA servers 304, 306. The events from the same UPC UA server type look exactly the same, since they are created from the same software running in multiple instances. Before an event from an aggregated OPC UA server can be forwarded, the aggregating server needs to transform the event.

The transformed event needs to be moved to the context of the partition of aggregated address space that represents the aggregated OPC UA server 304 or 306. This is necessary since data submitted with an event refers to data of an address space. The address space is the environment that publishes an event. Whenever an event submitted value refers to an element (node) in the address space, this value is qualified by the identity of the namespace.

The current implementation of the aggregating server 312 transforms (translates) these namespace-qualified values from their origin to the aggregated namespace like this is done for any of the aggregated nodes. The information provided with an event is standardized by OPC UA by means of a complete type hierarchy defined for BaseEventType. In OPC UA alarms are specific types of events. The information provided with an alarm is defined in the UPC UA specified ConditionType or any of the subtypes thereof. The OPC UA specified ConditionType is a sub-type of BaseEventType. Therefore, subsequent descriptions focus on events because the described problem stems from a commonality between alarms and events. According to the UPC UA specification, the origin of an event can be described with the BaseEventType defined property SourceName. The data type of SourceName is string. This means, the value provided through property SourceName is not bound to a namespace. As a remark, OPC UA defines a data type QualifiedName, which allows putting a string value into the context of a namespace. In a direct relation between an OPC UA client and an UPC UA server, this is no issue. In an aggregation scenario, the forwarding of the event conveyed SourceName, the receiver, i.e., the OPC UA client, will see the same SourceName in different events although the event came from different OPC UA servers, e.g., 304 or 306, if those OPC UA servers are made from the same type, e.g., type A in FIGS. 3 and 4. Even if the value of the property SourceName probably matches with a BrowseName of a Node in the address space of an aggregated server, which is not enforced by the UPC UA specification, the value of the SourceName may not be as unique as a NodeId, which is the unique address of a node in the address space of an aggregated server.

As a remark, in the context of an address space, a single BrowseName cannot be used to find a node. A browse path, which is a kind of a sequence of BrowseNames, can be used to find a node.

Since the UPC UA client 314 needs to differentiate the origin of an event, the aggregating OPC UA server 312 shall transform the value provided with the event's property SourceName. The problem described so far is relevant for any other event provided value that is not embedded into the context of a namespace.

Figure 4:
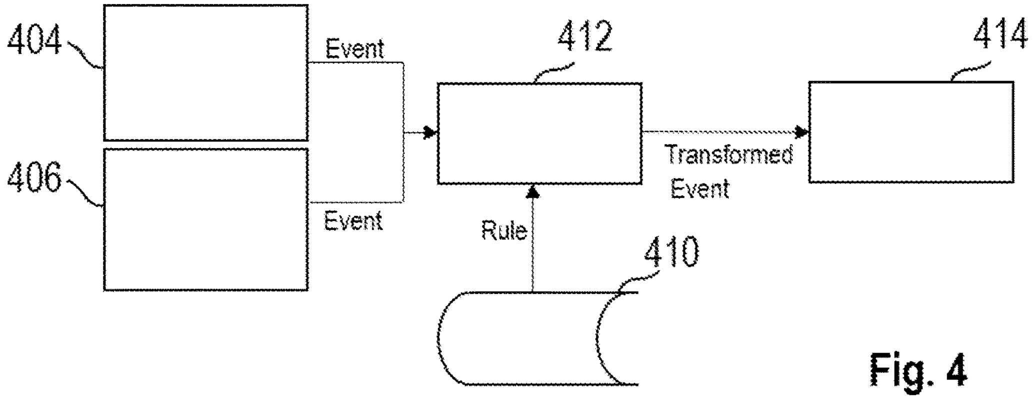
FIG. 4 is a diagram of an aggregating system, in which events are transformed, according to an embodiment of the present disclosure.

FIG. 4 shows an aggregating system 400, in which the source names of for events are aggregated, according to an embodiment. The aggregating OPC UA server 412 has the ability of to transform property values of events and alarms. The transformation rules support OPC UA client applications that have certain knowledge about the aggregated address space, in terms of these OPC UA client applications knowing about the applications behind the aggregated items. The transformation can be configured to simplify the application level based interpretation of alarms in the OPC UA clients 414.

The rules about the event transformation describe how to override certain properties of an event. The structure of configuration data is made from nested look-up tables considering the following facts, which are illustrated in parts in FIG. 5. Examples for look-up tables are given in FIGS. 6 to 9.

Figure 5:
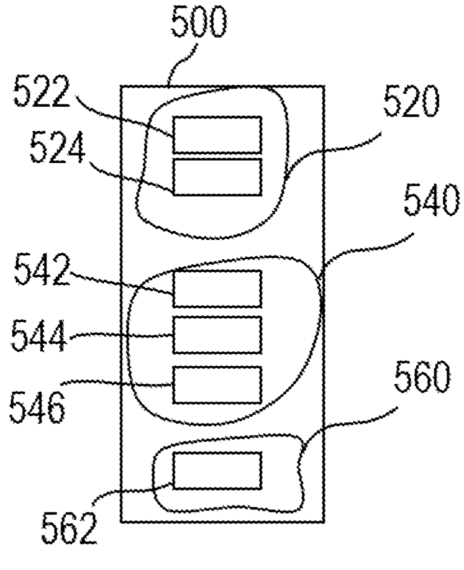
FIG. 5 is a diagram of an OPC UA server comprising namespaces and nodes in accordance with the disclosure.

(1) There are multiple aggregated OPC UA servers 404, 406 for which an event override may be defined. One of these servers 404, 406 is depicted in FIG. 5 as server 500.

(2) A single aggregated OPC UA server 404, 406, or 500, respectively, may contain multiple namespaces 520, 540, 560.

(3) A single namespace 520, 540, 560 may have multiple nodes 522, 524; 542, 544, 546; 562 that can be a source of events.

(4) A single event contains multiple properties for which the override will be defined.

FIG. 6 shows a screen clip with details of an alarm as provided by an alarm server. The data type of "ConditionId" is a NodeId, which refers to an existing node in the address space. An OPC UA client can use the ConditionId to check the data of the node, as shown in FIG. 7. FIG. 8 shows the entries of the table when this demo server is aggregated the forwarded event needs to be translated. The value of the property ConditionId must belong to an existing Node in the aggregated address space as shown in the screen clip in FIG. 9.

Once the OPC UA client 414 subscribes for an event, the aggregating OPC UA server 412 checks whether an operand in the submitted event filter refers to an event-property for which an override is defined in "Event Data Override". The found rule, e.g., "Prefix_" in SourceName in FIG. 8, is added to that operand. E.g., the prefix-value "SRV_0_NS_2_ID_" of "Identifier" in FIG. 8. The specific configuration of an EventMonitoredItem is kept while the subscription remains active. When the aggregating OPC UA server 412 receives an event, the aggregating OPC UA server 412 checks each of the operands of the event related operands whether there is an override configured inside. The override found inside the operand is then used to transform the value of the operand-referred event-property before the aggregating OPC UA server 412 forwards the event with an overridden property to the OPC UA client.

The system shown in FIG. 4 may have a modular composition, similar to the automation system shown in FIG. 3. The override data may be, for example, external data provided by a file or by a manual input.

Similarly, the transformation is applied for the forwarding of events implemented in aggregating OPC UA server. When a remote OPC UA server sent event contains a Nodetd, this is an address of a node available in the remote address space (Remote Node). When a remote OPC UA server sent event contains a BrowseName (QualifiedName), this is a name of a node available in the remote address space (remote BrowseName). The aggregating OPC UA server must transform such values that are bound to a namespace before it can forward the event. The forwarded contained namespace qualified values event must be found in the aggregated address space.

Figure 10:
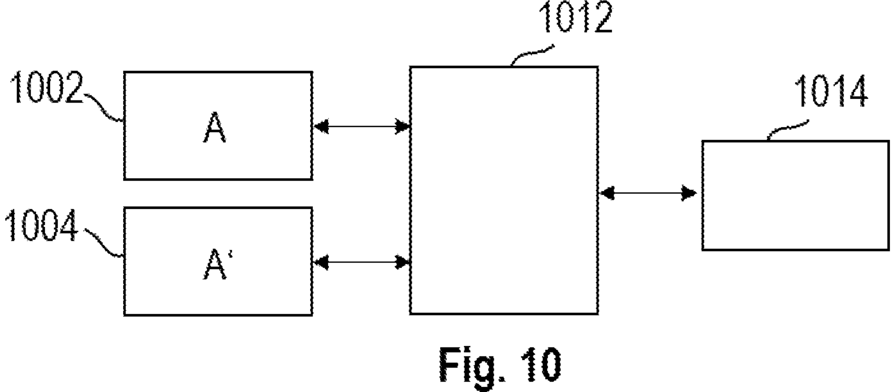
FIG. 10 is a diagram of an OPC UA aggregation system with two identical devices, according to an embodiment of the present disclosure.
Figure 11:
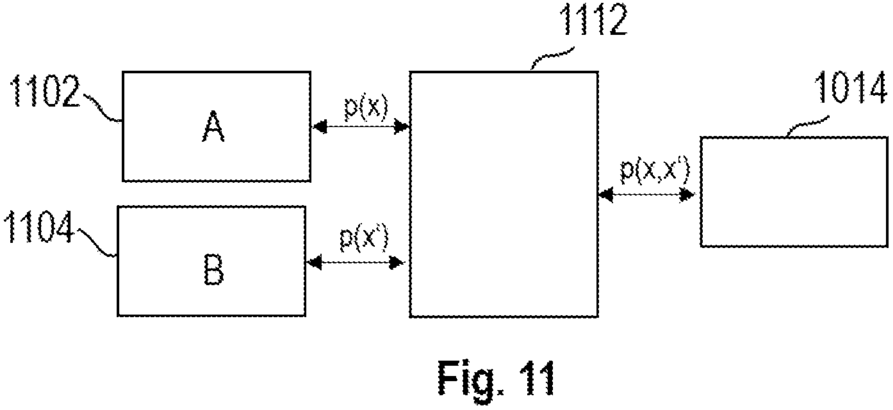
FIG. 11 is a diagram of an OPC UA aggregation system with two different devices, according to an embodiment of the present disclosure.

Redundancy concepts increase the liability of a system. Instruments implement embedded OPC UA Server connectivity, however, integration of instruments through server aggregation lowers their performance burden. The proposed aggregation service supports redundancy concepts for complete address spaces or particular nodes of aggregated OPC UA servers. The aggregation service supports further redundancy concepts for identical and different device types implementing an optimized address space representation for redundant devices. FIG. 10 shows an OPC UA aggregation system, where two identical devices 1002 and 1004 provide redundancy that is supported by the OPC UA aggregation server 1012, so that an optimized address space representation is implemented, and the client 1014 may access the address space of the devices 1002, 1004 represented by the aggregation server 1012. Similarly, FIG. 11 shows an OPC UA aggregation system with two different devices 1102, 1104, which may, however, provide redundant data p(x) and p(x'). The redundant data p(x,x) is provided from the OPC UA aggregation server 1112 to the OPC UA client 1114.

Figure 12:
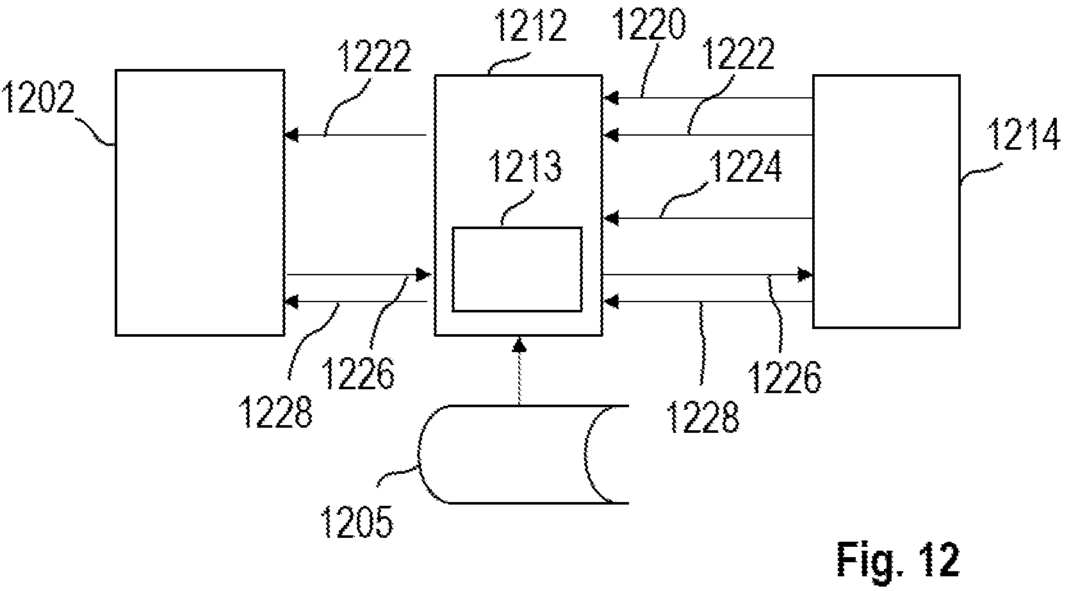
FIG. 12 is a diagram of an OPC UA aggregation system for reducing data traffic, according to an embodiment of the present disclosure.

The major part in an OPC UA address space is static meta data. During commissioning and operation only a few data items are dynamic. Especially during control operations the communication should focus on the transfer of IO-signals. The proposed aggregation service reduces the traffic to devices to the actually dynamic values of a device. E.g., the aggregation service could reduce the traffic to the device considering only values of variables and method calls. FIG. 12 shows an OPC UA system, where a configurable traffic filter 1213 is implemented that filters traffic that otherwise would flow between the device or server 1202 and the OPC UA aggregation server 1212. The filter 1213, which may be a self-tuning traffic optimization logic, is configured by the traffic filter configuration 1205, which provides the filter rules to the OPC UA aggregation server 1212. For example, the client sends requests or data for browsing 120, read/write values 122, sends a call 1228, and static data as Read DisplayName, Description, Browsename, etc. Further, it receives alarms 1226. In the example, the static data is blocked by the filter and only Read/Write values 1222, method calls 1228 and alarms 1226 are transmitted.

Figure 13:
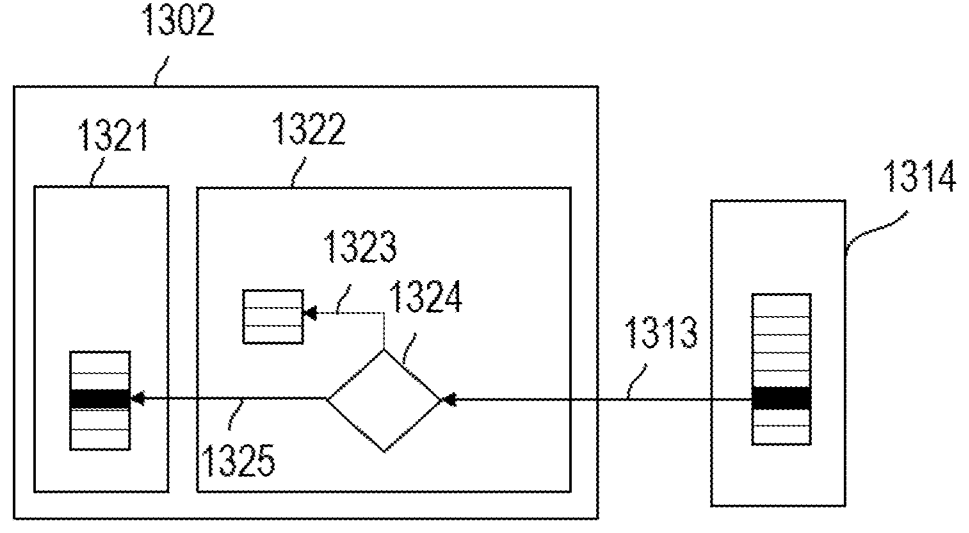
FIG. 13 is a diagram of an OPC UA server, which is cascaded into a software OPC UA server and a hardware accelerated OPC UA server, according to an embodiment of the present disclosure.

Since the storage capacity in FPGA based, fast hardware accelerated OPC UA servers is limited versus instrument required storage capacity, a software extensible FPGA managed address space is provided that supports fast real-time I/O action and slower parameterization. Devices combine the hardware accelerated, fast real-time 10 signal exchange with software extended address space to support general device management functions (parameterization, configuration, diagnosis). FIG. 13 shows a device, i.e., an OPC UA server 1312, which is cascaded into a software OPC UA server 1301 and a hardware accelerated OPC UA server 1302. The OPC UA client 1314 sends, for example, a Get command 1313. The hardware accelerated OPC UA server 1302 checks 1306 if hardware accelerated data is available. If yes 1306 the storage of the hardware accelerated OPC UA server 1302 is accessed. Otherwise 1305, the storage of software OPC UA server 1301 is accessed.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

According to an embodiment, the OPC UA aggregation server is configured to aggregate data from the remote address space on demand at a time when requested. By this embodiment decreases the necessary bandwidth and time, and nevertheless provides the data required by a client instantaneously and complete. The data is transmitted from the remote address space to the aggregating server only when requested, e.g., by a client. That is, the data that is aggregated by the aggregation server is only a part of the data of the remote namespace, and the points of time when the data is aggregated is distributed over a time span, where the time span is a time span during a running session instead of during start-up of the system. This means, that the system is in a operable state before aggregating the data. If an application starts accessing a node in the aggregated address space, the aggregation process checks its availability in a cache. If the cache does not contain the requested node, the aggregation process imports the requested node, i.e., the aggregating OPC UA server builds its internal cache from actual OPC UA client invoked services.

According to an embodiment, the OPC UA aggregation server is configured to store remote address space information of a current session. Remote address space information may be any information about the remote address space as, e.g. relations and information about the structure, node IDs ("nodeIDs"), URLs (Uniform Resource Locator), meta data, etc. A session may be defined as the running of an application or a process on the client device or the server device, between a start-up and a shut-down of the application or process. The session is related to an application on an OPC UA client or server, and the OPC UA aggregation server is configured to use the remote address space information in a next session for aggregating data. That is, seen from a next session, information that has been stored in the aggregation server in, or due to a previous session, may be used to find and collect the data of the remote namespace. The stored data may be partial information of the remote address space. E.g., it comprises information about a subset of one or more nodes or servers as addresses, names and/or relations, out of the entire number of nodes and servers in the remote address space. A subset of nodes may be distributed over more than one server.

According to an embodiment, the OPC UA aggregation server obtains remote namespace information from a configuration file. The remote namespace information may thus, according to the first aspect, be partial remote namespace information. The configuration file may be created manually, or preferably created and updated automatically. That is for example, information about the remote namespace, that is likely not to change often, as e.g., the structure or the URLs of the remote namespace, may be stored in a configuration file, which may be read at set-up, an specific data of the servers to be aggregated, as type definitions and object data, may be aggregated on demand. Therefore, when a request from a client is received by the aggregation server, the servers in the remote namespace may be addressed directly and also additional information, for example, node IDs, may be provided to the remote server to allow a fast processing of the aggregation request and a fast reply.

According to an embodiment, the OPC UA aggregation server is configured to store the data aggregated on demand in a cache. That is, upon the request at a point of time, complete information of a node and eventually related of referenced nodes, that may also contain values of the variable, may be stored in a cache. In case the values are living values, i.e., values that change e.g., in real time or near real time, the values may not be cached or flagged such that they are re-aggregated when requested. The complete data may further comprise type definitions, references or dependencies, descriptive data, etc. In this way, the caching of the data is delayed with respect to a usual aggregation system. Instead of caching the data at start up, i.e., before the system is operational, the caching is performed during the operation. Once data is cached, it doesn't have to be aggregated in future sessions any more, except of, e.g., values as, for example, living values that are changing steadily.

According to an embodiment, the OPC UA aggregation server is configured to use information based on configuration data of an application. That is, configuration data may not or not only be stored on aggregation server side but at the client, that may be provided to the aggregation server with the request of the client. For example, the application of an OPC UA client knows about the application relevant subsets of the partial remote address space to be aggregated.

According to an embodiment, the information based on configuration data of an application is a subset of nodes of the aggregated address space, wherein the subset of nodes is identified through a NodeId. From a previous session or based on prepared configuration data an application, for example, an OPC UA client, has information about the application relevant subset of the aggregated address space. The type of the NodeId may be specified by OPC UA. The NodeId that is used in the aggregated address space is designed in a way allowing to infer the URL of the aggregated OPC UA server and to calculate the NodeId of a node in the address space of an aggregated OPC UA server.

According to an embodiment, the NodeId used by the OPC UA aggregation server is composed such that an URL of the aggregated OPC UA server and the NodeId of a node in the remote address space of an aggregated OPC UA server can be extracted. This allows a NodeId translation, which is explained in detail further below, and enables a fast aggregation on demand and saving of memory.

According to an embodiment, the OPC UA aggregation server additionally aggregates node-context from the remote address space, i.e., the external or aggregated OPC UA server. If the cache does not contain the requested node, the aggregation process imports the requested node plus optionally needed node-context from the external, i.e., aggregated OPC UA server. The node-context is a set of nodes around the requested node where references associate the requested node to its context. References between nodes allow browsing nodes in an address space. The import and its final representation in the aggregated address space of the requested node including its context supports the preservation of its recognizable semantics.

According to an embodiment, the data comprises object data and type data. Object data items and type data items are separate structural components of the aggregated OPC UA server, however, it is worth to mention, that both, object data and type data are aggregated, since the OPC UA server first has to identify the related type data related to the requested object data and has to provide the identified type data in a separate sub-process.

According to an embodiment, the OPC UA aggregation server is configured to aggregate source names for events. An event may be, e.g., an alarm. According to an embodiment, the aggregation server is configured to import event override data, the override data defining an override of at least one property, and to transform the at least one property by using the imported event override data.

According to an embodiment, the at least one property is a source name.

According to an embodiment, the aggregating OPC UA server is configured to receive a client event subscription, upon receiving the client event subscription to check, whether an operand of the event refers to an event-property for which an override rule is defined, to add an override rule to the operand, and, when the aggregating OPC UA server receives an event, to check the operand whether there is an override configured inside. Further, the aggregating OPC UA server is configured to transform the value of the operand referred event-property according to the override rule before forwarding the event with an overridden property to a OPC UA client.

According to an embodiment, the OPC UA aggregation server supports redundancy types implementing an optimized address space representation for redundant devices.

According to an embodiment, the OPC UA aggregation server is configured to support redundancy for identical devices and/or for different devices.

According to an embodiment, the OPC UA aggregation server is configured to support redundancy for at least one node of the aggregated OPC UA servers or aggregated OPC UA servers, respectively.

According to an embodiment, the OPC UA aggregation server is configured to filter data to be aggregated before aggregating.

According to an embodiment, the OPC UA aggregation server is configured to filter data to aggregate only values of variables, method calls, and events such as alarms. The major part in an OPC UA address space is about static meta data. During commissioning and operation only a few data items are dynamic. Especially during control operations the communication should focus on the transfer of IO-Signals. An aggregation service could reduce the traffic to devices to the actually dynamic values of a device. The aggregation service optimizes the traffic load for aggregated (smaller) devices.

According to an aspect, an OPC UA aggregation system is provided. The OPC UA aggregation system comprises an OPC UA client configured to send a data request to an OPC UA aggregation server, an OPC UA aggregation server as described above, which is thus configured to aggregate nodes and import data from an OPC UA aggregation server, and an OPC UA aggregated server configured to provide the requested data to the OPC UA aggregation server. The system may comprise further clients, aggregated servers, structural and other components as for example, cache memory, data interfaces, human machine interfaces, etc.

According to an embodiment, the request of the client may comprise remote address space information for a requested subset of the aggregated address space, for example, a variable relating to an object, or a set of variables, and it may further comprise information supporting the OPC UA aggregation server to aggregate the data from the OPC UA aggregated server, which may be, for example, one or more NodeIds or URLs. For example, the client comprises, or has access to a storage comprising this information. The information may be stored as a client or system configuration or may be information based on previous sessions. The configuration may be stored locally or in a file.

According to an embodiment, the OPC UA aggregated server is configured to determine type data related to a comprising object data. As explained above, the OPC UA aggregated server first has to identify the related type data before providing it to the aggregating server.

According to an embodiment, the OPC UA aggregated server comprises a software OPC UA server and a hardware accelerated OPC UA server, and wherein the hardware accelerated OPC UA server is configured to check upon a data request if hardware accelerated data is available; if yes the storage of the hardware accelerated OPC UA server is accessed for retrieving the requested data; if no, the storage of software OPC UA server is accessed for retrieving the requested data.

According to an aspect, a method for aggregating remote address space data in an OPC UA system is provided. The method comprises the steps requesting, e.g., by an OPC UA client, remote address space data from an OPC UA aggregation server, aggregating remote address space data using data reduction and/or redundancy mechanisms, and providing and presenting the requested remote address space data, e.g., by the OPC UA client.

According to a further aspect, a computer program element is provided, which when being executed by a processor, instructs the aggregating server to perform the steps of the method described above.

The computer program element may be part of a computer program, but it can also be an entire program by itself. For example, the computer program element may be used to update an already existing computer program to get to the present invention.

According to a further aspect, a computer readable medium on which the program element is stored. The computer readable medium may be seen as a storage medium, such as for example, a USB stick, a CD, a DVD, a data storage device, a hard disk, or any other medium on which a program element as described above can be stored.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An Open Platform Communications Unified Architecture (OPC UA) aggregation server configured to:

receive a first service request from an OPC UA client, the service request including a NodeId;

where information pertaining to the service request is not available in a cache of the OPC UA aggregation server, use the NodeId of the service request to infer a URL of at least one OPC UA server and to calculate a NodeId of a node in a remote address space of the at least one OPC UA server;

initiate a second service request to the at least one OPC UA server based on the first service request;

filter data received from the remote address space of the at least one OPC UA server in response to the second service request via a configurable traffic filter using self-tuning traffic optimization logic;

aggregate the filtered data in an aggregated address space of the OPC UA aggregation server;

wherein the OPC UA aggregation server is configured for supporting data reduction and/or redundancy mechanisms;

wherein the OPC UA aggregation server is configured to store remote address space information of a current session;

wherein the session is related to an application and/or the OPC UA client; and wherein the OPC UA aggregation server is configured to use the remote address space information in a next session for aggregating data.

2. The OPC UA aggregation server according to claim 1, wherein the OPC UA aggregation server is configured to aggregate the data from the remote address space on demand at a time when requested.

3. The OPC UA aggregation server according to claim 2, wherein the OPC UA aggregation server is configured to store the data aggregated on demand in the cache.

4. The OPC UA aggregation server according to claim 2, wherein the aggregated data comprises object data and type data.

5. The OPC UA aggregation server according to claim 1, wherein the OPC UA aggregation server obtains partial remote address space information from a configuration file.

6. The OPC UA aggregation server according to claim 1, wherein the OPC UA aggregation server is configured to use information based on configuration data of an application.

7. The OPC UA aggregation server according to claim 5, wherein the information based on configuration data of an application is a subset of nodes of the remote address space, and wherein the subset of nodes is identified through the NodeId.

8. The OPC UA aggregation server according to claim 7, wherein the NodeId used by the OPC UA aggregation server is composed such that a URL of the at least one OPC UA server and the associated NodeId of the node in the remote address space of an aggregated OPC UA server are extractable.

9. The OPC UA aggregation server according to claim 1, wherein the OPC UA aggregation server additionally aggregates node-context from the remote address space.

10. The OPC UA aggregation server according to claim 1, wherein the OPC UA aggregation server is configured to aggregate source names for events; and wherein the OPC UA aggregation server is configured to import event override data, the override data defining an override of at least one property, and to transform the at least one property by using the imported event override data.

11. The OPC UA aggregation server according to claim 10, wherein the property is a source name.

12. The OPC UA aggregation server according to claim 10, wherein the aggregating OPC UA server is configured to: receive a client event subscription;

upon receiving the client event subscription, check whether an operand of the event refers to an event-property for which an override rule is defined;

add an override rule to the operand;

when the OPC UA aggregation server receives an event, check the operand whether there is an override configured inside; and transform a value of the operand referred event-property according to the override rule before forwarding the event with an overridden property to an OPC UA client.

13. The OPC UA aggregation server according to claim 1, wherein the OPC UA aggregation server is configured to support redundancy types implementing an address space representation for redundant devices.

14. The OPC UA aggregation server according to claim 13, wherein the OPC UA aggregation server is configured to support redundancy for identical devices and/or for different devices.

15. The OPC UA aggregation server according to claim 13, wherein the OPC UA aggregation server is configured to support redundancy for at least one node of the redundant devices.

16. The OPC UA aggregation server according to claim 1, wherein the OPC UA aggregation server is configured to filter the data to aggregate only values of variables, method calls and events.

17. An Open Platform Communications Unified Architecture (OPC UA) aggregation system, comprising:

an OPC UA client configured to send a first data request to an OPC UA aggregation server, the data request including a NodeId;

an OPC UA aggregation server configured to:

receive the first data request, and where information pertaining to the NodeId of the first data request is not available in a cache of has not been aggregated by the OPC UA aggregation server, use the NodeId of the first data request to infer a URL of at least one OPC UA server and to calculate a NodeId of a node in a remote address space of the at least one OPC UA server initiate a second data request to the at least one OPC UA server based on the first data request;

filter data received from the remote address space of the at least one OPC UA server in response to the second data request via a configurable traffic filter using self-tuning traffic optimization logic;

aggregate the filtered data of the at least one OPC UA server in an aggregated address space and provide OPC UA aggregated server data to the OPC UA client; and an OPC UA aggregated server configured to receive the second data request and provide the requested data to the OPC UA aggregation server;

wherein the OPC UA aggregation server is configured to:

aggregate the at least one OPC UA server in a remote address space;

wherein the at least one OPC UA server is configured for supporting data reduction and/or redundancy mechanisms;

wherein the OPC UA aggregation server is configured to store remote address space information of a current session;

wherein the session is related to an application and/or a OPC UA client; and wherein the OPC UA aggregation server is configured to use the remote address space information in a next session for aggregating data.

18. The OPC UA aggregation system according to claim 17, wherein the first data request of the OPC UA client comprises remote address space information for a requested subset of the aggregated address space, and information supporting the OPC UA aggregation server to aggregate the data from the OPC UA aggregated server.

19. The OPC UA aggregation system according to claim 17, wherein the OPC UA aggregated server is configured to determine type data related to an object comprising object data.

20. The OPC UA aggregation system according to claim 17, wherein the OPC UA aggregated server comprises a software OPC UA server and a hardware accelerated OPC UA server, and wherein the hardware accelerated OPC UA server is configured to check upon a data request if hardware accelerated data is available; wherein if hardware accelerated data is available, storage of the hardware accelerated OPC UA server is accessed for retrieving the requested data; wherein if hardware accelerated data is unavailable, the storage of software OPC UA server is accessed for retrieving the requested data.

21. A method for aggregating remote address space data in an Open Platform Communications Unified Architecture (OPC UA) system, comprising:

requesting, by an OPC UA client, remote address space data from an OPC UA aggregation server, the request including a NodeId;

where information pertaining to the request is not available in a cache of the OPC UA aggregation server, using the NodeId of the request to infer a URL of at least one aggregated OPC UA server and to calculate a NodeId of a node in an address space of the at least one OPC UA server:

initiate a second request to the at least one OPC UA server based on the request of the OPC UA client;

filter data received from the remote address space of the at least one OPC UA server in response to the second service request via a configurable traffic filter using self-tuning traffic optimization logic;

aggregating, by the OPC UA aggregation server, remote address space data using data reduction and/or redundancy mechanisms;

providing, by the OPC UA aggregation server, the requested remote address space data to the OPC UA client; and presenting, by the OPC UA client, the requested remote address space data;

wherein the OPC UA aggregation server stores remote address space information of a current session;

wherein the session is related to an application and/or the OPC UA client; and wherein the OPC UA aggregation server uses the remote address space information in a next session for aggregating data.

* * * * *